US009762597B2

(12) United States Patent
Doganata et al.

(10) Patent No.: US 9,762,597 B2
(45) Date of Patent: Sep. 12, 2017

(54) METHOD AND SYSTEM TO DETECT AND INTERRUPT A ROBOT DATA AGGREGATOR ABILITY TO ACCESS A WEBSITE

(71) Applicant: International Business Machines Corporation, Armonk, NY (US)

(72) Inventors: Yurdaer N. Doganata, Chestnut Ridge, NY (US); David Corbalan Luna, Barcelona (ES); Jordi Cahue Mestre, Barcelona (ES); Francisco Javier Noguera Pages, Barcelona (ES)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 14/836,341

(22) Filed: Aug. 26, 2015

(65) Prior Publication Data
US 2017/0063881 A1   Mar. 2, 2017

(51) Int. Cl.
*H04L 29/06* (2006.01)

(52) U.S. Cl.
CPC .......... *H04L 63/1416* (2013.01); *H04L 63/10* (2013.01); *H04L 63/1441* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 6,363,301 B1* | 3/2002 | Tackett | ................ | G06F 17/279 700/246 |
| 6,662,230 B1 | 12/2003 | Eichstaedt et al. | | |
| 7,346,338 B1* | 3/2008 | Calhoun | ............ | H04L 63/1408 455/410 |
| 7,516,220 B1* | 4/2009 | Stiert | ...................... | G06F 21/55 709/203 |
| 8,209,381 B2* | 6/2012 | Sinn | ...................... | H04L 12/585 706/12 |
| 8,244,752 B2* | 8/2012 | Buehrer | .................. | H04L 47/10 707/769 |
| 8,682,812 B1* | 3/2014 | Ranjan | ................ | H04L 63/1425 706/12 |
| 8,776,173 B2* | 7/2014 | Paxton | .................. | G06F 21/316 382/120 |
| 9,198,118 B2* | 11/2015 | Larue | .................... | H04W 48/16 |
| 9,215,123 B1* | 12/2015 | Fears | ...................... | H04L 67/22 |

(Continued)

*Primary Examiner* — Trang Doan
(74) *Attorney, Agent, or Firm* — Fleit Gibbons Gutman Bongini Bianco PL; Jose Gutman

(57) ABSTRACT

An information processing system, a computer readable storage medium, and a method to detect and block a robot data aggregator from accessing a website. A method includes defining a set of important features of business operations associated with users using a website. A feature value for each important feature is extracted from collected session data of a user session using the website. A user classifier classifies the user session as being with a human user or a robot user. Based on the classifying, access to the website by a robot user is blocked. Training user session data is also generated from the collected user session data thereby the user classifier learns and improves accuracy and reliability in detecting the type of user in a user session.

18 Claims, 8 Drawing Sheets

(56) References Cited

U.S. PATENT DOCUMENTS

| | | | |
|---|---|---|---|
| 2004/0117654 A1* | 6/2004 | Feldman | G06F 21/6218 |
| | | | 726/22 |
| 2007/0078983 A1 | 4/2007 | Modrall | |
| 2008/0052763 A1* | 2/2008 | Hum | H04W 12/12 |
| | | | 726/3 |
| 2009/0162824 A1* | 6/2009 | Heck | G06Q 10/10 |
| | | | 434/322 |
| 2009/0328163 A1* | 12/2009 | Preece | G06F 21/36 |
| | | | 726/5 |
| 2010/0287228 A1* | 11/2010 | Hauser | G06F 21/36 |
| | | | 709/203 |
| 2011/0131652 A1* | 6/2011 | Robinson | H04L 63/1408 |
| | | | 726/22 |
| 2011/0314537 A1* | 12/2011 | Hulten | G06F 21/31 |
| | | | 726/17 |
| 2012/0151559 A1* | 6/2012 | Koudys | G06F 21/316 |
| | | | 726/3 |
| 2013/0031037 A1* | 1/2013 | Brandt | H04L 63/1408 |
| | | | 706/12 |
| 2015/0163242 A1* | 6/2015 | Laidlaw | G06F 21/552 |
| | | | 726/22 |
| 2015/0205944 A1* | 7/2015 | Turgeman | G06F 21/316 |
| | | | 726/7 |
| 2015/0205958 A1* | 7/2015 | Turgeman | G06F 21/554 |
| | | | 726/23 |
| 2015/0213065 A1* | 7/2015 | Sisk | G06Q 10/10 |
| | | | 707/692 |

* cited by examiner

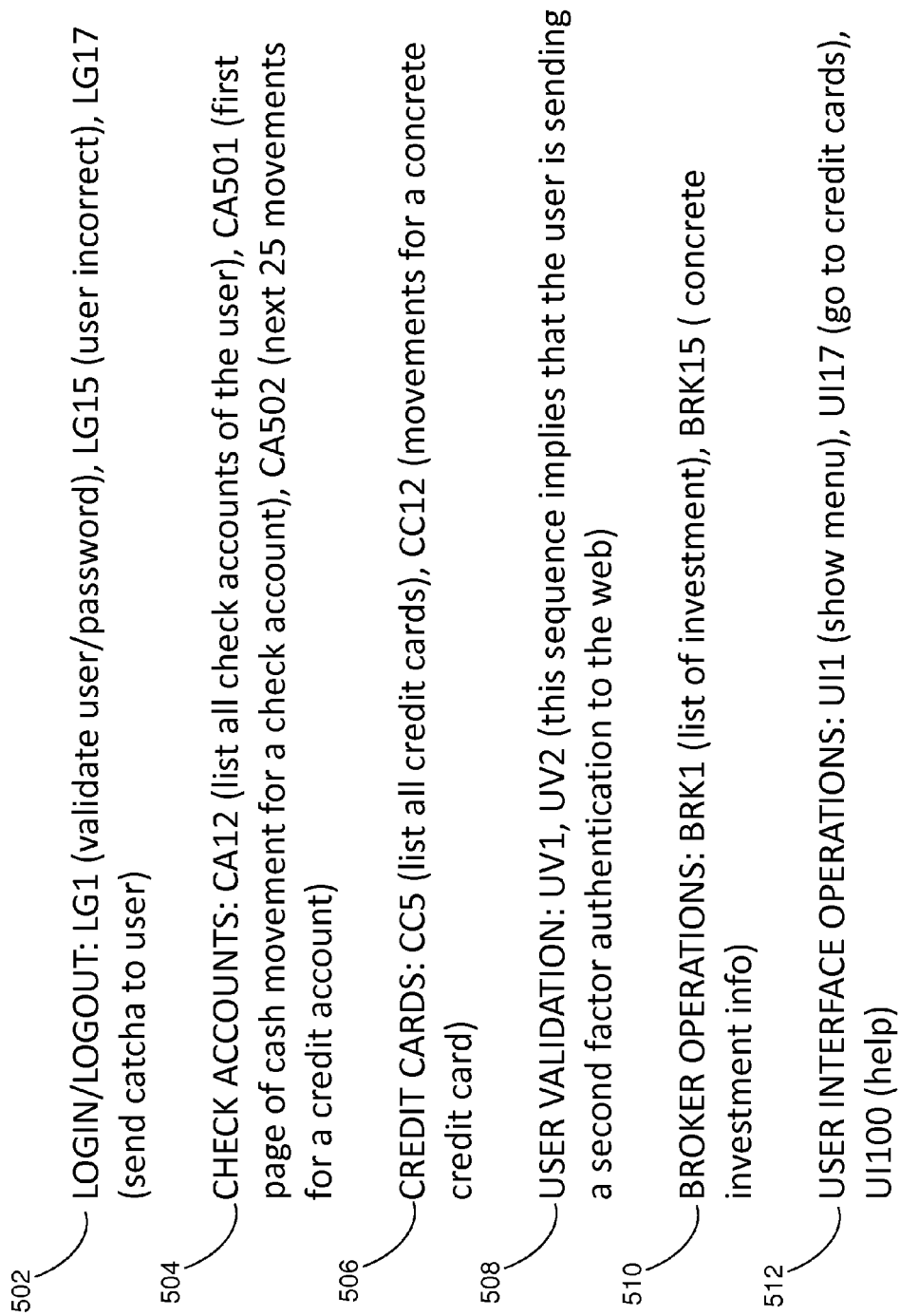

FIG. 5

502 — LOGIN/LOGOUT: LG1 (validate user/password), LG15 (user incorrect), LG17 (send catcha to user)

504 — CHECK ACCOUNTS: CA12 (list all check accounts of the user), CA501 (first page of cash movement for a check account), CA502 (next 25 movements for a credit account)

506 — CREDIT CARDS: CC5 (list all credit cards), CC12 (movements for a concrete credit card)

508 — USER VALIDATION: UV1, UV2 (this sequence implies that the user is sending a second factor authentication to the web)

510 — BROKER OPERATIONS: BRK1 (list of investment), BRK15 ( concrete investment info)

512 — USER INTERFACE OPERATIONS: UI1 (show menu), UI17 (go to credit cards), UI100 (help)

FIG. 6

| FEATURE | IMPORTANCE | DESCRIPTION |
|---|---|---|
| PATTERN_POS7_BPV1_BPV1 | 1.0 | List of 3 business operations invoked by robots often together |
| IPDIF | 1.0 | Number of different IPs during the session; the aggregator robot uses a battery of routers to obtain user information from the homebanking application; every request can be sent with a different IP; this should not happen with an human user |
| NUM_[GCT100_GCT102_GCT102] | 1.0 | Number of request to obtain the 'Transactions from a credit account; usually a robot request all the credit accounts transactions but a human may go directly to a main account |
| F_CUSTOMER_GLOBAL_POSITION | 1.0 | Family of operations related to the global position of the customer. It includes accounts, credit cards, loans, mortgages, etc |
| GEOCOUNTRY | 1.0 | Country of the IP of the request |
| F_UNIFIED_TRANSFERS | 1.0 | Family of operations related to transfers between accounts; usually aggregator robots don't do transfers between accounts because it requires a "second factor" token |
| F_RISK_OPERATION_VALIDATION | 1.0 | Family of operations related to risk validation on operations; an aggregator robot should not use it |
| ISHUMAN | 1.0 | Feature indicanting that the AUT_1 AUT_2 business operations are used, ie, a human has been requested to use the "second factor" token |
| F_TRANSFER_TO_OWN_ACCOUNT | 1.0 | Family of operations related to transfers between accounts for the same client; not used by aggregator robots |
| F_LOGIN_LOGOUT | 1.0 | LOGIN and LOGOUT operations; the sequence of logins may be slighly different between humans and robots |
| F_PERSONAL_MAILBOX | 1.0 | Access to internal mailbox on the homebanking application; this should be used only by humans |
| F_APPLICATION_MENUS | 0.99999999999987605 | Use of the web application menus (GFIs ops); usually a robot goes directly to the menu it needs; however a human does more try and test |
| F_HOMEBANKING_CUSTOMER_CONFIG | 0.9999999794884913 | Configuration of the homebanking web application (theme, favorites, etc); only a human should use this operations |
| F_HELP_MANAGEMENT | 0.999999973361345777 | Help pages of the homebanking web application |
| GFI_NUM | 0.9999986171050872 | Number of web interface menus selected |
| F_UNIFIED_TRANSFERS_INFO | 0.9999963306714448 | Related to transfers; only a human should use it |
| F_DASHBOARD | 0.999793078917586 | Warnings ? |
| F_SCREEN_POPUPS | 0.9987928625041691 | Related to screen popups of the web application |
| F_MY_HOME | 0.990949672569630 | Access user's personalized home on the homebanking web app |
| F_HOMEBANKING_SHOP | 0.968383909908741 | The shop inside the homebanking app |
| F_INTERNATIONAL_TRANSFERS | 0.9506780689001599 | International transfers; used only by humans |

602 — FEATURE column
604 — IPDIF row
606 — F_RISK_OPERATION_VALIDATION row
608 — F_LOGIN_LOGOUT row
610 — F_PERSONAL_MAILBOX row
612 — F_HOMEBANKING_CUSTOMER_CONFIG row

FIG. 7

| SESSIONID | TIMESTAMP | DURATION | IPLIST | NUM_OPER | AVG_TIME_OPER | GFI_NUM | GCT_NUM | POS_NUM | FOL_NUM | OPER_SEQ |
|---|---|---|---|---|---|---|---|---|---|---|
| 00VmyvSCh | 2.01E+13 | 11 | 79.157.40.124 | 12 | 0.917 | 5 | 2 | 0 | 0 | 0 LGN_8 LGN_24 LGN_12 LGN_8 LGN_24 LGN_16 |
| 03xgvWcJDi | 2.01E+13 | 7 | 79.159.235.151 | 13 | 0.538 | 8 | 2 | 0 | 0 | 0 GCT_12 GCT_100 |
| 0NkLynXBIv | 2.01E+13 | 404 | 88.19.149.137 | 119 | 3.395 | 63 | 11 | 0 | 2 | 0 LGN_24 LGN_8 LGN_16 LGN_24 LGN_23 LGN_8 LGN_9 GCT_12 LGN_16 GCT_100 GCT_102 GCT_102 GCT_102 GCT_102 GCT_102_0 GCT_102 GCT_102 |
| 0nRS9lI1gfS | 2.01E+13 | 27 | 81.45.23.204 | 18 | 1.5 | 9 | 9 | 0 | 0 | 0 LGN_140 |
| 0phz2TTr8v | 2.01E+13 | 23 | 89.140.98.159 | 14 | 1.643 | 7 | 1 | 0 | 0 | 0 LGN_1 LGN_8 LGN_16 |
| JTbCGp2Ng | 2.01E+13 | 1103 | 77.209.152.140 | 26 | 42.42 | 16 | 5 | 0 | 2 | 0 LGN_24 LGN_8 LGN_8 LGN_8 |
| JTGYg11593 | 2.01E+13 | 90 | 2.140.176.69 | 29 | 3.103 | 15 | 9 | 0 | 0 | 1 LGN_24 LGN_8 LGN_23 LGN_8 |
| Lvh1vTlJRjd | 2.01E+13 | 152 | 79.159.185.132 | 19 | 8 | 11 | 5 | 0 | 0 | 0 LGN_24 LGN_8 LGN_16 |
| LvkPWlgDcl | 2.01E+13 | 9 | 79.153.95.165 | 17 | 0.529 | 9 | 6 | 0 | 0 | 0 LGN_24 LGN_8 LGN_16 |
| XpzKG8pm= | 2.01E+13 | 5920 | 188.78.84.99 | 39 | 151.8 | 25 | 5 | 0 | 0 | 0 LGN_24 LGN_8 LGN_16 |
| xpZMgZSGr | 2.01E+13 | 1 | 2.138.184.42 | 3 | 0.333 | 0 | 0 | 0 | 0 | 0 LGN_24 LGN_23 LGN_8 |
| xQ5yG9w4\ | 2.01E+13 | 11 | 188.77.213.189 | 9 | 1.222 | 5 | 1 | 0 | 0 | 0 LGN_24 LGN_8 LGN_16 |
| xzBCSD3f6p | 2.01E+13 | 15 | 81.45.23.148 | 33 | 0.455 | 17 | 5 | 0 | 2 | 5 LGN_24 GCT_12 LGN_8 |
| yzpVyqGdD | 2.01E+13 | 256 | 85.137.224.236 | 28 | 9.143 | 21 | 0 | 0 | 0 | 0 LGN_1 LGN_8 DOM_11 |
| ZTxNSRYRn | 2.01E+13 | 0 | 83.50.141.51 | 2 | 0 | 0 | 0 | 0 | 0 | 0 LGN_24 LGN_8 |
| ZTZYffTKz1E | 2.01E+13 | 1 | 2.138.188.61 | 3 | 0.333 | 0 | 0 | 0 | 0 | 0 LGN_24 LGN_23 LGN_8 |
| zv2cQqqQ7 | 2.01E+13 | 10 | 62.117.176.43 | 14 | 0.714 | 8 | 2 | 0 | 0 | 0 LGN_8 LGN_24 LGN_16 |

METHOD AND SYSTEM TO DETECT AND INTERRUPT A ROBOT DATA AGGREGATOR ABILITY TO ACCESS A WEBSITE

BACKGROUND

The present disclosure generally relates to website information processing systems, and more particularly relates to a system and method for detecting robot data aggregators attempting to access a website information processing system.

Data aggregator robots can gather account information from various websites using account holders credentials. The aggregated information may then be provided to the account holders from a single website operated by the aggregators.

Financial institutions are concerned about potential liability, security, and a possibility of diminishing traffic to the institution's website. Institutions want to provide a high quality service for their customers accessing the institution's website. Institutions also want to block access by robots spoofing the website to aggregate data and to block other unauthorized robot access.

A number of techniques have been used to detect robot users and limit the access to human users. The most common technique is the CAPTCHA method where users are asked to type letters presented in a distorted image that is expected to be understandable by humans only. CAPTCHA method is effective but not user friendly. Human users have their access interrupted and in some cases the CAPTCHA method restricts valid users when the user has a visual deficiency. Other techniques include comparing the list of IP addresses known to be associated with robot users. This approach becomes ineffective since the IP addresses of robots may change. Yet another technique analyzes a user-agent string that contains information that the client sent to the server. This approach is not reliable because it is possible to create fake user agents. If robots use fake user agents, then it will not be possible to differentiate their access from human user access. Recently minimum expected human response time (MEHRT) is used to detect robot access of a web-interface. This technique is based on ascertaining a minimum expected human response time to complete a predetermined task, prompting the user to complete the task in response to user-access of a web-based interface; and preventing the user from completing the task until the minimum expected human response time has passed from the time the prompt is made to impose a time penalty on robots accessing the web-based interface. The MEHRT technique is ineffective for response times which are not very short (robot user) or very long (human user). High accuracy may not be achieved. Other drawback of the MEHRT technique is that a completion of a task may be intentionally delayed for robots by the programmers.

BRIEF SUMMARY

According to one embodiment of the present disclosure, provided is a computer-based method to detect and block a robot data aggregator from accessing a website. The method comprising: analyzing business operations and session data associated with using a website, the session data being collected from a session history log of user sessions, including human user sessions and robot user sessions, that use the business operations while accessing and/or navigating the website; defining, based on the analyzing, a set of important features of the collected session data from the user sessions, a feature value for each feature in the set of important features being extractable from each user session; extracting a feature value for each feature in the set of important features from the session data collected from each user session; classifying the session data collected from each user session as being with a human user or a robot user; and generating training user session data, the training user session data comprising: collected session data from each user session in the session history log; extracted feature values from the collected session data from each user session; and a classifier flag value indicating that the extracted feature values are from a user session with a human user or a robot user.

According to another embodiment of the present disclosure, provided is a method with an information processing system, to detect and block a robot data aggregator from accessing a website, the method comprising: defining a set of important features of business operations and session data associated with using a website, the session data being collected from user sessions, including human user sessions and robot user sessions, that use the business operations while accessing and/or navigating the website, a feature value for each feature in the set of important features being extractable from each user session; monitoring user sessions that use the business operations while accessing and/or navigating the website, and collecting user session data from each user session; extracting a feature value for each feature in the set of important features from the session data collected from a user session; classifying with a user classifier the session data collected from each user session as being with a human user or a robot user, the user classifier comprising a model of behaviors of important business operations using the website based on training user session data that is stored in a training user session data repository in a memory, the model including a set of decision rules that the user classifier follows to determine the type of user of a user session as either a human user or a robot user; blocking, based on the classifying, access to the website by a robot user that has been determined from the collected user session data to have accessed and/or navigated business operations while using the website; and generating, based on the classifying, training user session data from the collected user session data, the training user session data comprising: collected session data from the user session; extracted feature values from the collected session data; and a classifier flag value, that has been assigned to the extracted feature values by the user classifier, indicating that the extracted feature values are from a user session with a human user or a robot user.

According to another embodiment of the present disclosure, an information processing system comprises: memory; a network interface for interfacing the website information processing system with one or more web communication networks; a web server for providing business operations to users of a website while accessing and/or navigating the website during user sessions; a user classifier for classifying users of the website as either human users or robot users; and a processor, communicatively coupled with the memory, the network interface, the web server, and the user classifier, the processor, responsive to computer instructions, performing a method to detect and block a robot data aggregator from accessing the website, the method comprising: defining a set of important features of business operations and session data associated with using the website, the session data being collected from user sessions, including human user sessions and robot user sessions, that use the business operations while accessing and/or navigating the website, a feature value for each feature in the set of important features being extractable from each user session; monitoring user sessions that use the business operations while accessing and/or navigating the website, and collecting user session data from each user session; extracting a feature value for each feature in the set of important features from the session data collected from a user session; classifying with the user classifier the session data collected from each user session as being with a human user or a robot user, the user classifier comprising a model of behaviors of important business operations using the website based on training user session data that is stored in a training user session data repository in the memory, the model including a set of decision rules that the user classifier follows to determine the type of user of a user session as either a human user or a robot user; blocking, based on the classifying, access to the website by a robot user that has been determined from the collected user session data to have accessed and/or navigated business operations while using the website; and generating, based on the classifying, training user session data from the collected user session data, the training user session data comprising: collected session data from the user session; extracted feature values from the collected session data; and a classifier flag value, that has been assigned to the extracted feature values by the user classifier, indicating that the extracted feature values are from a user session with a human user or a robot user.

According yet to another embodiment of the present disclosure, a computer readable storage medium comprises computer instructions which, responsive to being executed by a processor, cause the processor to perform operations for: defining a set of important features of business operations and session data associated with using the website, the session data being collected from user sessions, including human user sessions and robot user sessions, that use the business operations while accessing and/or navigating the website, a feature value for each feature in the set of important features being extractable from each user session; monitoring user sessions that use the business operations while accessing and/or navigating the website, and collecting user session data from each user session; extracting a feature value for each feature in the set of important features from the session data collected from a user session; classifying with the user classifier the session data collected from each user session as being with a human user or a robot user, the user classifier comprising a model of behaviors of important business operations using the website based on training user session data that is stored in a training user session data repository in the memory, the model including a set of decision rules that the user classifier follows to determine the type of user of a user session as either a human user or a robot user; blocking, based on the classifying, access to the website by a robot user that has been determined from the collected user session data to have accessed and/or navigated business operations while using the website; and generating, based on the classifying, training user session data from the collected user session data, the training user session data comprising: collected session data from the user session; extracted feature values from the collected session data; and a classifier flag value, that has been assigned to the extracted feature values by the user classifier, indicating that the extracted feature values are from a user session with a human user or a robot user.

BRIEF DESCRIPTION OF THE SEVERAL VIEWS OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 is a list of example families of operations for an information processing system, according to various embodiments of the present disclosure;

FIG. 6 is a table illustrating examples of important features for an information processing system, according to various embodiments of the present disclosure; and FIGS. 7 and 8 provide a table illustrating examples of feature values for a set of features for an information processing system, according to various embodiments of the present disclosure.

DETAILED DESCRIPTION

Figure 1:
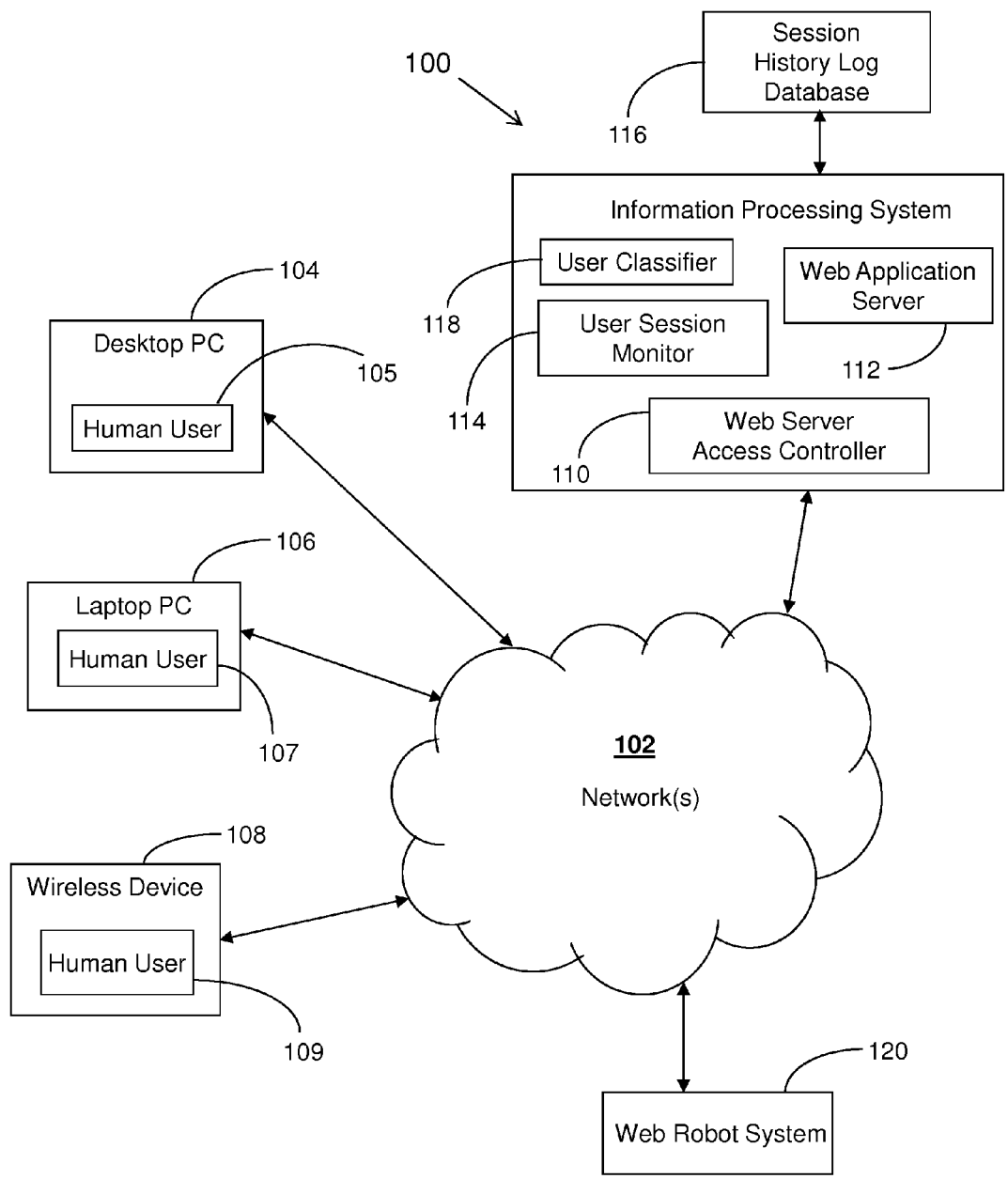
FIG. 1 is a block diagram illustrating an example of an operating environment for an information processing system, according to various embodiments of the present disclosure.

According to various embodiments of the present disclosure, disclosed is a system and method to differentiate website access by robot users from website access by human users. According to the present disclosure, a website information processing system learns the access behavior of human users as opposed to the access behavior of aggregator robots by analyzing the website's user session logs and with this information discriminating the website access and navigation behaviors of human users from robot users.

Introduction

A website information processing system, according to various embodiments, can learn human user behaviors and robot user behaviors from the sequence, frequency, and duration of business operations accessed in the past via the website. Historical behavior of robot users and human users is used to build a predictive model which classifies each access as human or robot.

For example, on a typical website of a financial institution, a user can perform about 150 different business operations. These can include gathering information about their checking accounts, savings accounts, and credit card accounts, and performing various transactions, downloading tax forms, accessing financial news, etc. The way a human user accesses the business operations accessible at the website differs from a robot user in terms of the frequency, redundancy, and sequence. Historical traces of business operations coming from robot users and human users can be collected from the web server. This collected information can be used as training data for a classifier that learns from the information to discriminate robot users from human users.

Programming robots to act like human users is not practical. Hence, behavioral differences will always be a good indicator of who is the user of the website. Additionally, according to various embodiments of the disclosure, a website can learn and adapt to changing human user or robot user behavior. A classifier, for example, uses about 150 features related to business operations. Once the robot user is identified from the session information, the IP address is identified and the robot is blocked by the website.

According to an embodiment of the disclosure, a website information processing system collects data within a session in the application server for cases where the type of user is known. The data is collected for more than 100 features that are defined for business operations of the website. The business operations that are invoked by the application servers can be traced from the session information A classifier can be developed from the session logs from the web server. The classifier uses the classification model to decide if the user is human or robot.

From a set of features defined initially based on the existing business operations in the website information processing system, session data is collected from the session log, and training data is filtered and extracted from the session data. The training data is labeled as human user or robot user based on the sessions that are already identified. A classifier is then built using the classification training data. Decision rules are generated in terms of the feature values derived from the model of the classifier.

In order to detect the type of a user accessing the website (e.g., web portal), according to an example, first the session data is analyzed. If the IP address of the user is within the list of IP addresses of the robot users that accessed the web portal in the past, the user is identified as robot user and the access to the website is blocked. Otherwise, the classification model is used to classify the user as robot user or human user. If it is determined that the user is a robot user, a session information features table is updated to identify the robot user and associated feature values (e.g., IP address, etc.) detected in the particular collected session data.

Classifier Builder

The classifier builder 230 can comprise any commercially available tool for building the model for a user classifier. The model can include on or more of the following example models.

As one example, a logistic regression model is one of the classification models that can be used to determine if the user is a robot user as discriminated from a human user. The model provides the probability that the user is a robot given the feature values. Feature values are obtained through empirical observation.

A probability can be calculated that a future observed set of feature values is from a robot user session, based on the observed feature values and compared against a threshold value. If the probability is greater than the threshold, the user is labeled as robot user.

According to a second example, a decision tree model is another type of classifier model that can be used to make a decision. In the decision tree model, according to the example, the decision depends only on three feature values: PATTERN_GCT102_FROM_QUERY, F_RISK_OPERATION_VALIDATION, and AVG_TIME_OPER.

The accuracy of the decision tree model based on webserver session log data can be high. The inventors, for example, have tested the accuracy of a classifier using the decision tree model and achieved 99.78% accuracy to discriminate a robot user from a human user.

Example Operating Environment

Referring to FIG. 1, an example operating environment is shown including an information processing system 100 communicatively coupled with one or more networks 102. Several other information processing systems 104, 106, 108, and 120, are also communicatively coupled with the networks 102. A desktop PC 104 is operated by a human user 105. A laptop PC 106 is also operated by a human user 107. A wireless device 108 is also operated by a human user 109. A Web Robot System 120 is communicatively coupled with the networks 102.

The information processing system 100 comprises a website which, in this example, includes a web server and a web application server. The web server communicates with the remote network systems 104, 106, 108, 120 and controls access to the website using a web server access controller 110. A web application server 112 operates with the web server to provide one or more applications to users of the website. Users may be human users or robot users.

A user session monitor 114 in the information processing system 100 monitors user sessions while the users are accessing/navigating the website. The user session monitor 114 collects session data from a user session and stores the session data in memory. A user classifier 118 operates with the web server to identify a human user or a robot user accessing the website. Session information is maintained in a history log database 116. The Session History Log Database 116 collects session data from many different users accessing the website over time.

Figure 2:
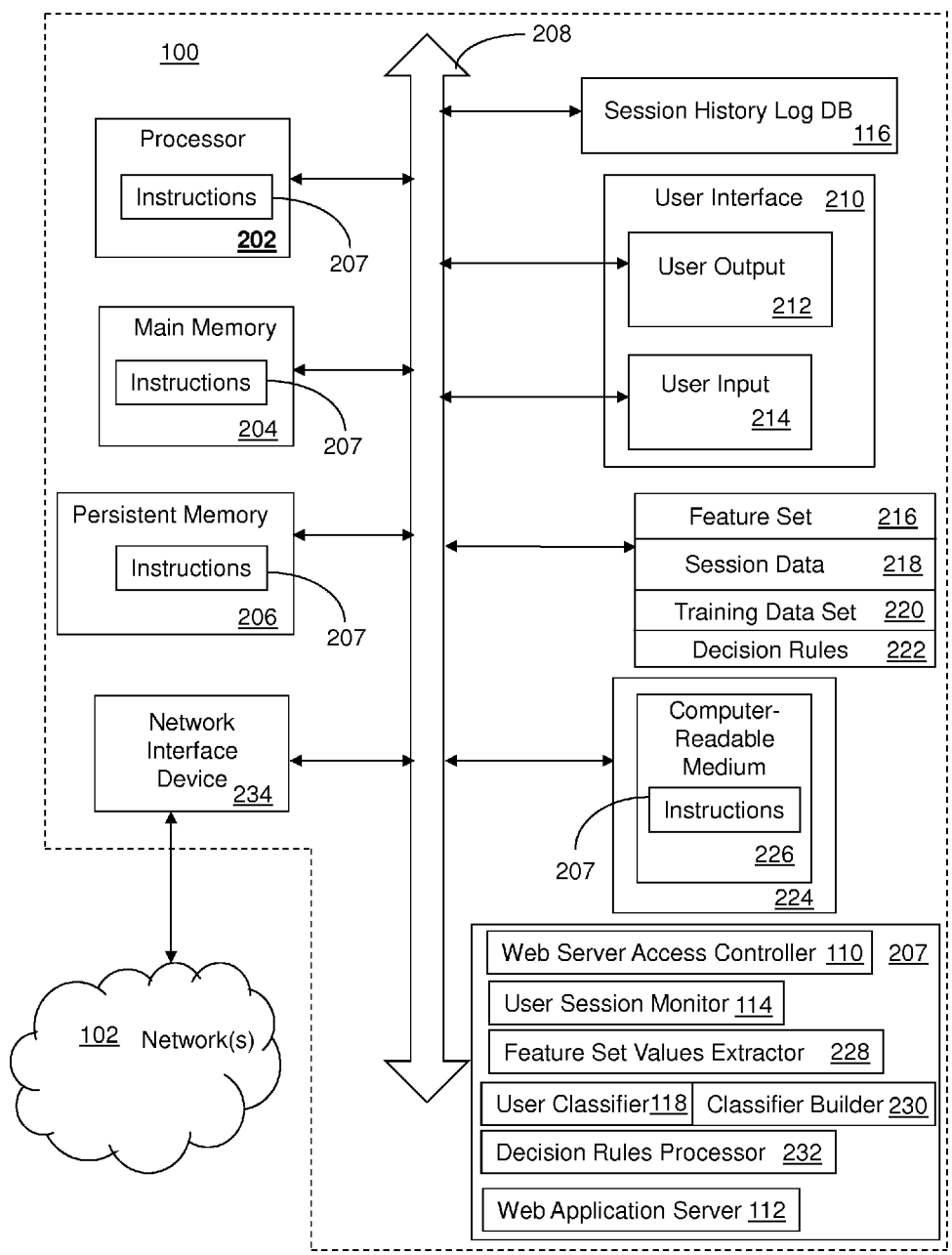
FIG. 2 is a block diagram showing a more detailed view of the information processing system of FIG. 1.

Referring to FIG. 2, a more detailed view of the information processing system 100 is shown. At least one processor 202 is communicatively coupled with main memory 204 and with persistent memory 206. Persistent memory 206 provides non-volatile storage of information used by the at least one processor 202. Instructions, data, and configuration parameters, which can be individually or collectively also referred to as Instructions 207, may be stored in the main memory 204, the persistent memory 206, and/or a computer readable medium 226 that is readable via a computer interface device 224 such as a disk drive or other computer interface device. According to the example, the information processing system 100 comprises a computer system/server that includes a variety of computer readable media. Such media may be any available media that is accessible by the information processing system 100, and which can include both volatile and non-volatile media, removable and non-removable media.

A bus or bus communication architecture 208 is utilized by the information processing system 100 to facilitate communication between the various elements of the information processing system 100. The session history log database 116, according to the present example, is communicatively coupled with the processor 202 via the bus communication architecture 208.

Bus 208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A user interface 210 provides a user output interface 212 and a user input interface 214. The user output interface 212 includes, according to the present example, a display, and audio output interface such as one or more speakers, and various indicators such as visual indicators, audible indicators, and haptic indicators. A user input interface 214 includes, according to the present example, a keyboard, a mouse or other cursor navigation module such as a touch screen, touch pad, a pen input interface, and a microphone for input of audible signals such as user speech, data and commands that can be recognized by the processor 102

In this example, memory includes storage of a feature set 216, session data 218, a training data set 220, and decision rules 222, as will be discussed in more detail below. The user session monitor 114 collects session data from a user session and stores the session data 218 in memory 204. The feature set 216, the training data set 220, and the decision rules 222, are stored in persistent memory 206.

The instructions 207, according to the present example, include the web server access controller 110, the user session monitor 114, the web application server 112, the user classifier 118, a feature set values extractor 228, a classifier builder 230, and a decision rules process 232. A network interface device 234 communicatively couples the information processing system 100 with the networks 102.

Figure 3:
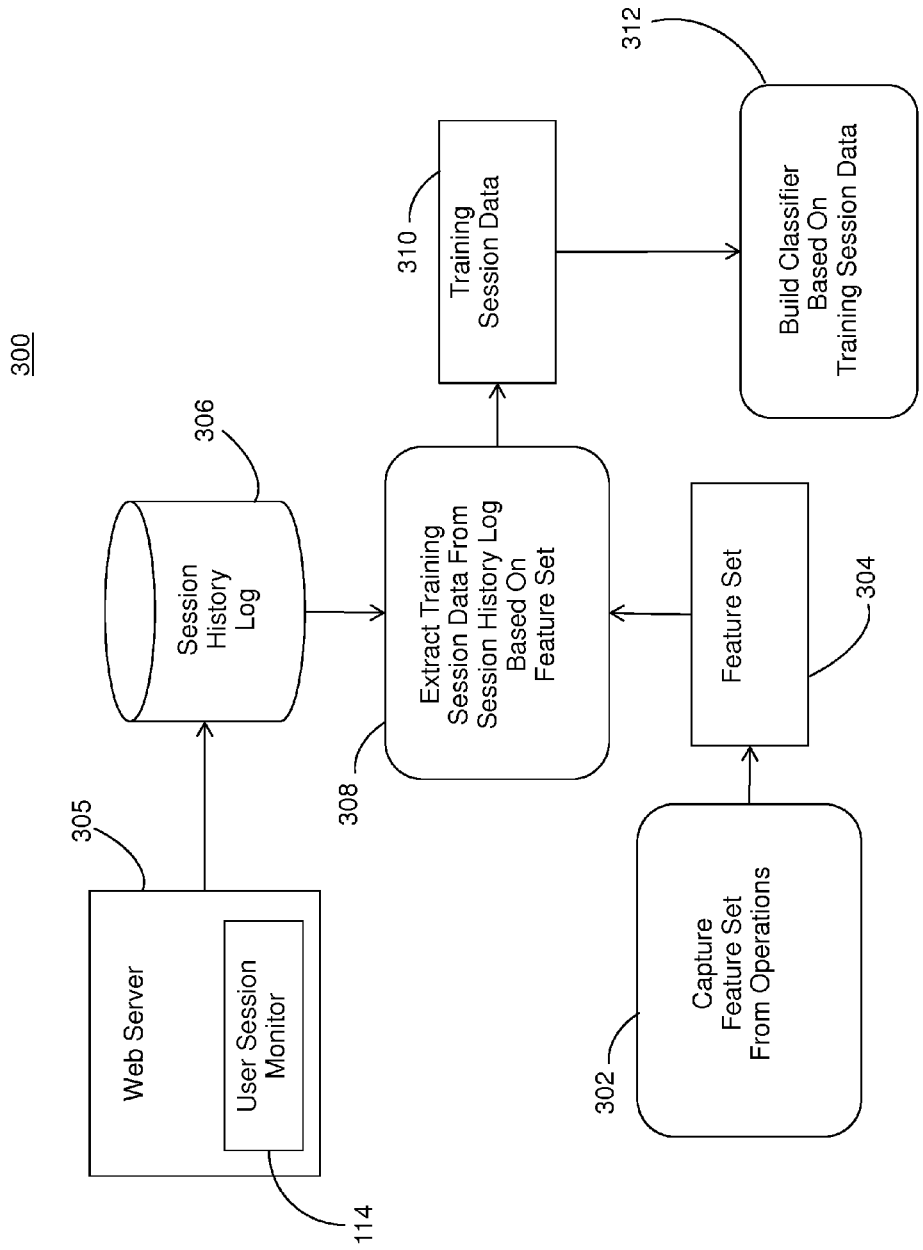
FIGS. 3 and 4 are functional block diagrams illustrating functional components of the example information processing system in FIGS. 1 and 2, according to various embodiments of the present disclosure.

Referring to FIG. 3, a functional block diagram 300 of a portion of the information processing system 100 is shown. The user session monitor 114 in the web server 305 can monitor user session data while users access the web server and the web application server 112.

Session data is collected and stored in the session history log 306. The session history log 306 includes session data collected from many different users accessing/navigating the web server 305 and the web application server 112 over time.

The information processing system 100 can be used to extract 308 training session data 310 from the session history log database 116, 306 based on a set of important features that has been defined for the web server, the web application server 112, and associated business operation of the website. The training session data stored in a repository in memory 220, 310 comprises feature values corresponding to a set of important features (e.g., a feature vector) for each session collected from the session history log database 116, 306. Additionally, the training session data for each session includes a flag indicating the type of user accessing/navigating the website during the particular session. The type of user can be a human user or a robot user. The flag is set for each session training data based on past determination that a particular session was conducted with either a human user or a robot user accessing/navigating the website.

For example, a financial institution has a website offering online banking to members, and thereby provides web applications via the web application server 112 to users that are online accessing the financial institution's website via the networks 102. According to the financial institution's business operations, a feature set 304 of the important features of business operations conducted by users via the website is captured. An expert can analyze the business operations and define the set of important features and their importance to the business operations. Alternatively, a classification algorithm can be used to analyze the business operations and define the set of important features and their importance to the business operations. An example of such a classification algorithm is called "Feature Selector" which is part of the IBM SPSS Modeler Products software which is commercially available from International Business Machines Corporation of Armonk, N.Y., USA. This software may be found at the following Internet URL: http://www-01.ibm.com/software/analytics/spss/products/modeler/. The feature set 216, 304 is stored in persistent memory 207 in the information processing system 100.

The feature set 304 is used by the information processing system 100 to extract 308 feature values from session data collected from the session history log database 116, 306. Based on past experience identifying particular sessions as being with either robot users or human users, a classification flag is associated with the feature values extracted from session data for each collected session. The classification flag indicates whether the extracted feature values correspond to a human user or a robot user of the bank's website. The collection of extracted feature values and associated classification flags generates a training session data stored in a repository 220, 310 that can be used to train a user classifier builder 230 to learn which collected session data (represented by the extracted feature values) was done with a robot user or a human user. The user classifier builder 230 uses this learned information to build a predictive model 414 and associated decision rules 412 for a user classifier 408. The model is based on the training user session data.

In summary, according to the example, the training session data is stored in a training session data repository 220, 310 in persistent memory 206. Based on this training session data 310, a classifier builder 230 builds 312 a classifier 408, with a model and decision rules, based on the training session data 310.

Figure 4:
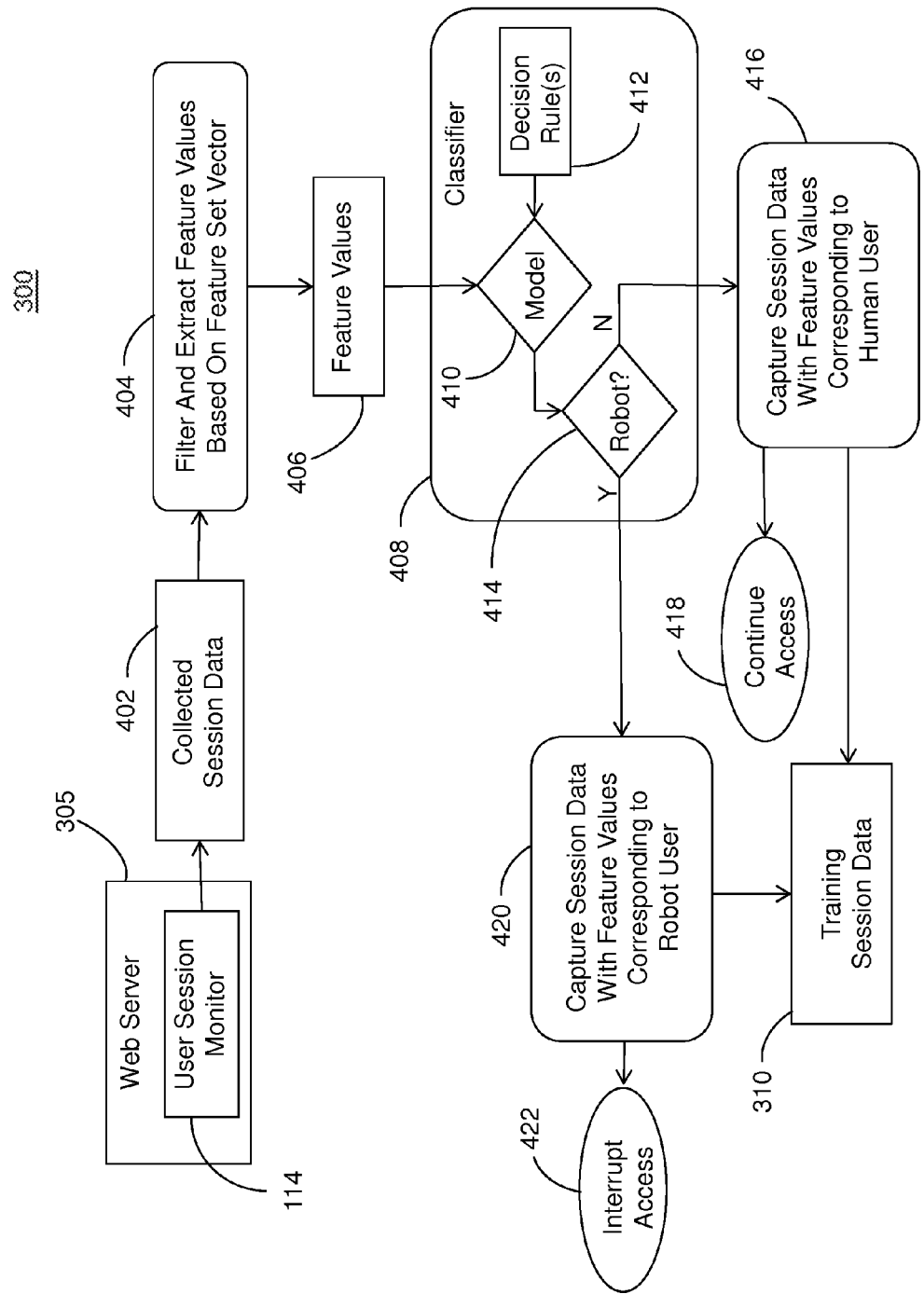

Referring now also to FIG. 4, the classifier 408 that is built by the classifier builder 230 can be used by the information processing system 100 to help identify users accessing/navigating the bank's website as being one of a human user or a robot user, as will be discussed below.

During operation of the website, the information processing system 100 uses the web server 305 and the user session monitor 114 to collect session data from users accessing the website. The collected session data 218, 402 is stored in memory 207 and analyzed by the feature set values extractor 228 which filters and extracts 404 feature values from the collected session data based on the feature set vector 304. The extracted feature values 406 are stored in memory 204 and provided to the classifier 408.

The classifier 408 includes the predictive model 410 and one or more decision rules 412, which are processed with the decision rules processor 232, to analyze for each session the collected and extracted feature values 406 to determine 414 whether the session is being conducted with a human user or a robot user. According to the present example, if the classifier 408 determines 414 that the session is with a human user, then the extracted feature values and collected session data are captured 416 and stored in the training session data repository 220, 310, as a training data set identified as a session conducted with a human user. That is, for example, training user session data that is stored in a training user session data repository 220, 310, in memory can be updated with generated training user session data from the particular session data with a human user, which results in an updated training user session data being stored in the training user session data repository 220, 310. The classifier builder 230 will re-build the model and decision rules of the user classifier taking into consideration the updated training user session data. In this way, the information processing system 100 learns while monitoring online access sessions with users to better improve the accuracy and reliability of decisions made with the classifier 408. Also, the classifier 408 indicates to the web server access controller 110 that the session is with a human user and accordingly access to the website continues 418.

However, according to the example, if the classifier 408 determines 414 that the session is being conducted with a robot user, then the session data and the extracted feature values corresponding to the robot user are captured 420. The captured feature values and session data are used to generate training user session data from the particular session data with a robot user, and then stored in the training session data repository 220, 310, as a training data set identified as conducted with a robot user. That is, for example, training user session data that is stored in a training user session data repository 220, 310, in memory can be updated with generated training user session data from the particular session data with a robot user, which results in an updated training user session data being stored in the training user session data repository 220, 310. The classifier builder 230 will re-build the model and decision rules of the user classifier taking into consideration the updated training user session data. In this way, the information processing system 100 learns while monitoring online access sessions with users to better improve the accuracy and reliability of decisions made with the classifier 408.

When the classifier 408 determines 414 that the session is with a robot user, additionally, the classifier 408 indicates to the web server access controller 110 that the session is with a robot user and accordingly the session and access to the website are interrupted (i.e., blocked access) 422. In this way, robot users are denied (i.e., blocked from) access to the website and the web applications. It should be noted that the terms interrupted access and blocked access, and the like, may be used interchangeably and are meant to individually and collectively cover broadly many different situations where a robot user is blocked from accessing/navigating the website.

Examples of Families of Operation

According to various embodiments of the present disclosure, extracted feature values from session data are analyzed by the classifier 408 to determine whether a user is a human user or a robot user. A session includes a sequence of business operations done by a user while accessing/navigating the website, whether done by human user or robot user. These business operations can be organized by families of operations. Examples of families of operations are illustrated in FIG. 5, and will be discussed below.

A first family 502 of operations includes: LOGIN/LOGOUT: LG1 (validate user/password), LG15 (user incorrect), LG17 (send CATCHA to user). The sequence of logins and logouts can be slightly different between human users and robot users.

A second family 504 of operations includes: CHECK ACCOUNTS: CA12 (list all check accounts of the user), CA501 (first page of cash movement for a check account), CA502 (next 25 movements for a credit account). This family of operations is related to the user navigation using check accounts and accounts information.

A third family 506 of operations includes: CREDIT CARDS: CC5 (list all credit cards), CC12 (movements for a concrete credit card). This family of operations is related to the user navigation using credit cards information.

A fourth family 508 of operations includes: USER VALIDATION: UV1, UV2 (this sequence implies that the user is sending a second factor authentication to the web). This family of operations is related to the navigation of user validation operations. A robot user should not use it.

A fifth family 510 of operations includes: BROKER OPERATIONS: BRK1 (list of investment), BRK15 (concrete investment info). This family of operations is related to broker operations.

A sixth family 502 of operations includes: USER INTERFACE OPERATIONS: UI1 (show menu), UI17 (go to credit cards), UI100 (help). This family of operations is related to user navigation of the user interface operations. Usually a robot user goes directly to a menu it needs. However, a human user does more try and test of menus to arrive at the needed menu.

So, a typical navigation session by a user, whether a human user or a robot user, could include the following sequence of operations:

LG1, LG15, CA12, CA501, CA502, CA502, CA501, CA502, CC5, CC12, CC12, CC12

In such a case, the information processing system 100 can detect patterns (PATTERN_CA501502=TRUE). The information processing system 100 can also count the number of operations by family (F_LG=2, F_CA=6, F_CC=3). These metrics of user navigation of operations during a session while a user is accessing a website can be used to create a set of features. A set of features that defines all important features for business operations at the website is also referred to as a feature vector. Based on the feature vector, feature values 406 can be extracted from session data 402 (i.e., session data monitored while a user is accessing the website) and analyzed by a classifier 408 to discriminate between a human user and a robot user. The example sequence of operations provided above can be generated by a human user or a robot user. The information processing system 100 is able to classify the session as being done with a human user or a robot user, using a predictive model 408 based on the set of features 304 (i.e., the feature vector) for the particular business operations being modeled for the website.

FIG. 6 illustrates one example of a set of features defined as being important features representative of a particular business operation to classify a session accessing/navigating the website as being done by a human user or a robot user. The rows in the table identify the features. The columns, from left to right, designate the feature nick-name, the importance of the feature to the business operation, and a brief description of the particular feature. Only a small sub-set of a set of features is shown in FIG. 6, and only to illustrate the example.

A set of features can include hundreds of features defined as important for a particular set of business operations for a website. The importance of each feature to a particular set of business operations is analyzed with a classification algorithm in that set of business operations. An example of such a classification algorithm is called "Feature Selector" which is part of the IBM SPSS Modeler Products software which is commercially available from International Business Machines Corporation of Armonk, N.Y., USA. This software may be found at the following Internet URL: http://www-01.ibm.com/software/analytics/spss/products/modeler/. An importance metric, shown in the second column of the table in FIG. 6, is assigned to each feature as a result of use of the classification algorithm. An importance of 1.0 (100%) is the highest importance that can be assigned to a feature. For example, the feature named PATTERN_POS7_BPV1_BPV1 602 has been assigned an importance of 1.0. It represents three business operations often invoked by robot users. Several other features, including the features IPDIF 604, F_TRANSFER_TO_OWN_ACCOUNT 606, and F_PERSONAL_MAILBOX 608, are also assigned the highest importance of 1.0. The third column of the table in FIG. 6 briefly describes the feature and may also indicate how the feature is relevant to discriminating between a human user and a robot user. As another example, both features named F_APPLICATION_MENUS 610 and F_HELP_MANAGEMENT 612 have been assigned an importance of less than 1.0, with the feature F_HELP_MANAGEMENT 612 being a lower importance than the feature F_APPLICATION_MENUS 610.

According to the present example, a feature is considered to be an important feature if it is assigned an importance value threshold of at least 0.95 (95%). This threshold value could vary for different sets of business operations. The threshold value can also be assigned with the classification algorithm. While analyzing the features of a set of business operations relating to a user session accessing/navigating the website, the classification algorithm determines the set of important features that can be used to discriminate between a human user and a robot user.

Figure 8:
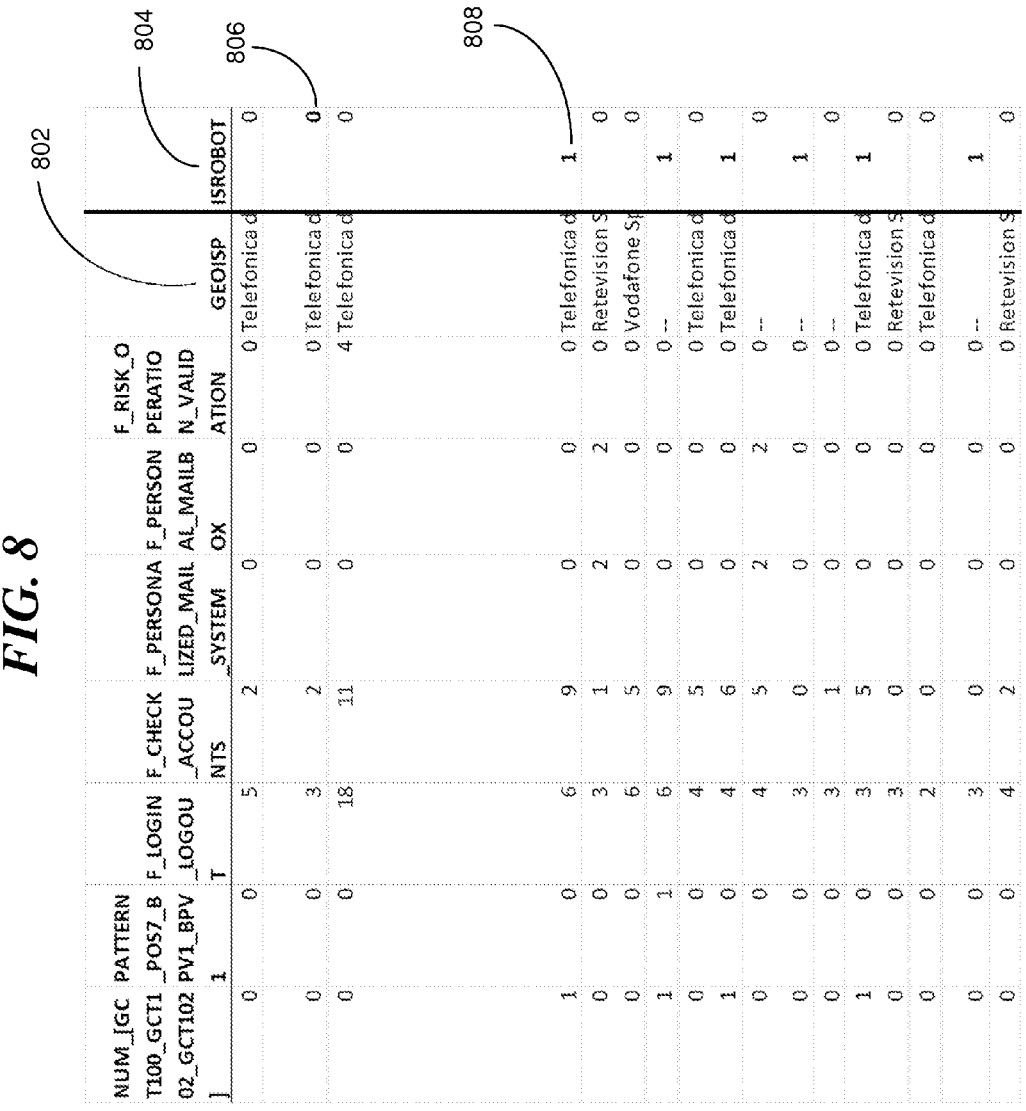

FIGS. 7 and 8 show two portions of the same table illustrating an example of important feature values extracted from session data, where the rows in FIG. 8 are a continuation of the rows in FIG. 7. Each row represents the important feature values from the session data of one session of a user accessing/navigating the website, such as implemented with the information processing system 100 shown in FIGS. 1 and 2. Each column shown in the table of FIGS. 7 and 8 is the feature value of one important feature of the set of features (i.e., the feature vector) for the set of business operations of the website. This table shows columns for only a small sub-set of a typically much larger number of important features. There can be hundreds of columns representing hundreds of important features defined for a particular set of business operations for a website.

Each row represents one user session of a user accessing/navigating the website, which is identified by a SESSIONID value 702. According to the example, a TIMESTAMP 704 is a feature extracted from session data of each user session. The duration of the session is indicated by the feature value DURATION 706. In this example, the duration value is expressed in seconds. For example, the user session indicated by the second row in the table has a duration value of seven seconds 718, while the user session indicated by the fourth row in the table has a duration value of twenty seven seconds 722. The feature value indicated by the column IPLIST 708 shows an IP address of the particular user session. The column NUM_OPER 710 indicates a number of operations that the user invoked during the user session. The column AVG_TIME_OPER 712 indicates an average time for performing each of the operations that the user invoked during the user session. The column OPER_SEQ 714 indicates a sequence of operations that the user invoked during the user session. For example, as shown in FIG. 7, the user session of the second row in the table shows a sequence of operations 716 which is different and much shorter than the sequence of operations 720 shown in the user session of the fourth row in the table. The length of a sequence of operations 714 generally would correspond to the duration 706 of the session, although not necessarily. For example, the duration value of seven seconds 718 and the sequence of operations 716 in the second row in the table are much shorter than the duration value of twenty seven second 722 and the sequence of operations 720 in the fourth row in the table.

In this example, the right-most column of the table of important features extracted from session data is shown in FIG. 8 as the feature GEOISP 802. This feature value identifies the internet service provider being used during the user session to access the website.

According to the example, the next column to the right in the table is named ISROBOT 804 and it is a classifier flag value that indicates whether the feature values for the session data of that particular user session (i.e., the particular row) are associated with either a human user, such as indicated by a flag value of zero 806 in the second row in the table, or a robot user such as indicated by a flag value of one 808 in the fourth row in the table.

When the table includes all columns (i.e., columns 702 to 802 in the table) representing the important feature values for each row representing each user session, and the table also includes the right-most column classifier flag value ISROBOT 804 for each user session, this collection of information represents an example of the training session data 310 (see FIG. 3). This training session data 310 can be used by the classifier builder 230 to learn and build the model 410 and the decision rules 412 of the classifier 408 (see FIG. 4). The classifier builder 230 learns from the training session data 310 to build the model 410 and decision rules 412 to discriminate the behavior of a human user from the behavior of a robot user during a user session accessing/navigating the website.

With the classifier 408 operating in the information processing system 100, the classifier 408 receives for each session the important feature values 406 extracted from the session data 402 of a user session accessing/navigating the website. Each row in the table shown in FIGS. 7 and 8, i.e., only the feature values in the columns 702 to 802, and not including the right-most column which is the classifier flag value ISROBOT 804, would be an example of feature values 406 that could be extracted from session data 402 captured from a user session accessing/navigating the website. That is, the inclusion of the right-most column classifier flag value ISROBOT 804 for each user session distinguishes an example of the training session data 310 from an example of the extracted feature values 406 used by the classifier 408. The training session data 310 is used by the classifier builder 230 to build the predictive model 410 and the decision rules 412 in the classifier 408.

When the classifier 408, during operation of the information processing system 100, determines that a robot user is, or was, conducting a user session accessing/navigating the website, the flag value ISROBOT 804 (e.g., indicated by a flag value of one) is added to the feature values extracted from the user session data, and this information is added to the training session data 310. When the classifier 408, during operation of the information processing system 100, determines that a human user is, or was, conducting a user session accessing/navigating the website, the flag value ISROBOT 804 (e.g., indicated by a flag value of zero) is added to the feature values extracted from the user session data, and this information is added to the training session data 310. In this way, the classifier builder 230 continuously, and repeatedly, re-builds the predictive model 410 and the decision rules 412 of the classifier 408 such that the classifier 408 continues to learn during operation of the information processing system 100. The information processing system 100 captures session data, extracts feature values from the session data, and adds the classifier flag when a user session is determined as one of human user or robot user, and then updates this information to the training session data in the repository 220, 310. The updated training session data is then used to re-build the model 410 and decision rules 412 of the classifier 408. This improves the classifier 408 to more accurately and reliably discriminate the behavior of a human user from the behavior of a robot user during a user session accessing/navigating the website.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems), and computer program products according to embodiments of the invention. It will be understood that each block of the flowchart illustrations and/or block functional diagrams, and combinations of blocks in the flowchart illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A computer-based method to block a robot data aggregator from accessing a website, the method comprising:
analyzing business operations and session data associated with using a website, the session data being collected from a session history log of user sessions, including human user sessions and robot user sessions, that use the business operations while accessing and/or navigating the website;
defining, based on the analyzing, a set of important features of the collected session data from the user sessions, a feature value for each feature in the set of important features being extractable from each user session;
extracting a feature value for each feature in the set of important features from the session data collected from each user session;
classifying the session data collected from each user session as being with a human user or a robot user;
generating training user session data, the training user session data comprising:
collected session data from each user session in the session history log;
extracted feature values from the collected session data from each user session; and
a classifier flag value indicating that the extracted feature values are from a user session with a human user or a robot user;
training a user classifier builder with the training user session data to build a user classifier including a model of behaviors of important business operations using the website, the model being based on the training user session data and including a set of decision rules that the user classifier follows to determine a type of user of a user session as either a human user or a robot user, and to discriminate a user session with a human user from a user session with a robot user; and
blocking access to the website by a robot user that has been determined, from user session data monitored from a user session, to have accessed and/or navigated business operations while using the website.

2. The method of claim 1, further comprising storing the training user session data in a training user session data repository in a memory.

3. The method of claim 1, wherein the model of the user classifier comprises at least one of
a logistic regression model; and
a decision tree model.

4. The method of claim 1, wherein the website is a financial institution website and the business operations associated with using the website comprise banking operations invoked by users of the financial institution website during user sessions while online accessing and/or navigating the financial institution website.

5. A method, with an information processing system, to discriminate and block a robot data aggregator from accessing a website, the method comprising:
defining a set of important features of business operations and session data associated with using a website, the session data being collected from user sessions, including human user sessions and robot user sessions, that use the business operations while accessing and/or navigating the website, a feature value for each feature in the set of important features being extractable from each user session;
monitoring user sessions that use the business operations while accessing and/or navigating the website, and collecting user session data from each user session;
extracting a feature value for each feature in the set of important features from the session data collected from a user session;
classifying with a user classifier the session data collected from each user session as being with a human user or a robot user, the user classifier comprising a model of behaviors of important business operations using the website based on training user session data that is stored in a training user session data repository in a memory, the model including a set of decision rules that the user classifier follows to determine a type of user of a user session as either a human user or a robot user;
blocking, based on the classifying, access to the website by a robot user that has been determined from the collected user session data to have accessed and/or navigated business operations while using the website; and
generating, based on the classifying, training user session data from the collected user session data, the training user session data comprising:
collected session data from the user session;
extracted feature values from the collected session data; and
a classifier flag value, assigned to the extracted feature values by the user classifier, indicating that the extracted feature values are from a user session with a human user or a robot user.

6. The method of claim 5, further comprising updating training user session data stored in a training user session data repository in a memory with the generated training user session data resulting in updated training user session data being stored in the training user session data repository.

7. The method of claim 6, further comprising:
training a user classifier builder with the updated training user session data stored in the training user session data repository to build a replacement model of behaviors of important business operations using the website, the replacement model being based on the updated training user session data stored in the training user session data repository and including a replacement set of decision rules that the user classifier follows to determine a type of user of a user session as either a human user or a robot user, and to discriminate a user session with a human user from a user session with a robot user; and replacing in the user classifier the model and the set of decision rules with the replacement model and the replacement set of decision rules, respectively.

8. The method of claim 5, wherein the model of the user classifier comprises a predictive model including at least one of
a logistic regression model; and
a decision tree model.

9. The method of claim 5, wherein the website is a financial institution website and the business operations associated with using the website comprise banking operations invoked by users of the financial institution website during user sessions while online accessing and/or navigating the financial institution website.

10. A website information processing system comprising:
memory;
a network interface for interfacing the website information processing system with one or more web communication networks;
a web server for providing business operations to users of a website while accessing and/or navigating the website during user sessions;
a user classifier for classifying users of the website as either human users or robot users; and
a processor, communicatively coupled with the memory, the network interface, the web server, and the user classifier, the processor, responsive to computer instructions, performing a method to block a robot data aggregator from accessing the website, the method comprising:
defining a set of important features of business operations and session data associated with using the website, the session data being collected from user sessions, including human user sessions and robot user sessions, that use the business operations while accessing and/or navigating the website, a feature value for each feature in the set of important features being extractable from each user session;
monitoring user sessions that use the business operations while accessing and/or navigating the website, and collecting user session data from each user session;
extracting a feature value for each feature in the set of important features from the session data collected from a user session;
classifying with the user classifier the session data collected from each user session as being with a human user or a robot user, the user classifier comprising a model of behaviors of important business operations using the website based on training user session data that is stored in a training user session data repository in the memory, the model including a set of decision rules that the user classifier follows to determine a type of user of a user session as either a human user or a robot user;
blocking, based on the classifying, access to the website by a robot user that has been determined from the collected user session data to have accessed and/or navigated business operations while using the website; and
generating, based on the classifying, training user session data from the collected user session data, the training user session data comprising:
collected session data from the user session;
extracted feature values from the collected session data; and
a classifier flag value, assigned to the extracted feature values by the user classifier, indicating that the extracted feature values are from a user session with a human user or a robot user.

11. The system of claim 10, wherein the processor, responsive to computer instructions, performs the following:
updating training user session data stored in a training user session data repository in the memory with the generated training user session data resulting in updated training user session data being stored in the training user session data repository.

12. The system of claim 11, wherein the processor, responsive to computer instructions, performs the following:
training a user classifier builder with the updated training user session data stored in the training user session data repository to build a replacement model of behaviors of important business operations using the website, the replacement model being based on the updated training user session data stored in the training user session data repository and including a replacement set of decision rules that the user classifier follows to determine a type of user of a user session as either a human user or a robot user, and to discriminate a user session with a human user from a user session with a robot user; and
replacing in the user classifier the model and the set of decision rules with the replacement model and the replacement set of decision rules, respectively.

13. The system of claim 10, wherein the model of the user classifier comprises a predictive model including at least one of
a logistic regression model; and
a decision tree model.

14. The system of claim 10, wherein the website is a financial institution website and the business operations associated with using the website comprise banking operations invoked by users of the financial institution website during user sessions while online accessing and/or navigating the financial institution website.

15. A non-transitory computer readable storage medium, comprising computer instructions which, responsive to being executed by a processor, cause the processor to perform operations to block a robot data aggregator from accessing a website, the operations comprising:
defining a set of important features of business operations and session data associated with using a website, the session data being collected from user sessions, including human user sessions and robot user sessions, that use the business operations while accessing and/or navigating the website, a feature value for each feature in the set of important features being extractable from each user session;
monitoring user sessions that use the business operations while accessing and/or navigating the website, and collecting user session data from each user session;
extracting a feature value for each feature in the set of important features from the session data collected from a user session;
classifying with a user classifier the session data collected from each user session as being with a human user or a robot user, the user classifier comprising a model of behaviors of important business operations using the website based on training user session data that is stored in a training user session data repository in a memory, the model including a set of decision rules that the user classifier follows to determine a type of user of a user session as either a human user or a robot user;

blocking, based on the classifying, access to the website by a robot user that has been determined from the collected user session data to have accessed and/or navigated business operations while using the website; and generating, based on the classifying, training user session data from the collected user session data, the training user session data comprising:
  collected session data from the user session;
  extracted feature values from the collected session data; and
  a classifier flag value, assigned to the extracted feature values by the user classifier, indicating that the extracted feature values are from a user session with a human user or a robot user.

16. The non-transitory computer readable storage medium of claim 15, wherein the processor performed operations further comprising:
  updating training user session data stored in a training user session data repository in a memory with the generated training user session data resulting in updated training user session data being stored in the training user session data repository.

17. The non-transitory computer readable storage medium of claim 16, wherein the processor performed operations further comprising:
  training a user classifier builder with the updated training user session data stored in the training user session data repository to build a replacement model of behaviors of important business operations using the website, the replacement model being based on the updated training user session data stored in the training user session data repository and including a replacement set of decision rules that the user classifier follows to determine a type of user of a user session as either a human user or a robot user, and to discriminate a user session with a human user from a user session with a robot user; and
  replacing in the user classifier the model and the set of decision rules with the replacement model and the replacement set of decision rules, respectively.

18. The non-transitory computer readable storage medium of claim 17, wherein the replacement model of the user classifier comprises a predictive model including at least one of
  a logistic regression model; and
  a decision tree model.

* * * * *